(12) United States Patent
Yogo

(10) Patent No.: US 12,265,368 B2
(45) Date of Patent: Apr. 1, 2025

(54) CONTROL PROGRAM GENERATION APPARATUS, CONTROL PROGRAM GENERATION METHOD, AND PROGRAM

(71) Applicant: OPTON Co. LTD., Aichi (JP)

(72) Inventor: Teruaki Yogo, Aichi (JP)

(73) Assignee: OPTON Co. LTD., Aichi (JP)

( * ) Notice: Subject to any disclaimer, the term of this patent is extended or adjusted under 35 U.S.C. 154(b) by 463 days.

(21) Appl. No.: 17/831,153

(22) Filed: Jun. 2, 2022

(65) Prior Publication Data

US 2022/0291653 A1 Sep. 15, 2022

Related U.S. Application Data

(63) Continuation of application No. PCT/JP2021/002502, filed on Jan. 25, 2021.

(30) Foreign Application Priority Data

Jan. 28, 2020 (JP) .................................. 2020-011386

(51) Int. Cl.
G05B 19/05 (2006.01)

(52) U.S. Cl.
CPC ......... G05B 19/056 (2013.01); G05B 19/052 (2013.01)

(58) Field of Classification Search
CPC ................ G05B 19/056; G05B 19/052; G05B 2219/36243; G05B 2219/36276;

(Continued)

(56) References Cited

U.S. PATENT DOCUMENTS 5,122,717 A 6/1992 Hayashi
2003/0023347 A1* 1/2003 Konno ............... G05B 19/0426
700/245

(Continued)

FOREIGN PATENT DOCUMENTS

EP 1077396 A1 2/2001
JP H3-154105 A 7/1991

(Continued)

OTHER PUBLICATIONS

International Search Report issued in PCT/JP2021/002502 mailed on Mar. 30, 2021 with English Translation (5 pages).

(Continued)

*Primary Examiner* — Christopher E. Everett
(74) *Attorney, Agent, or Firm* — Nakanishi IP Associates, LLC

(57) ABSTRACT

Element actions of actuators incorporated in an automated manufacturing machine are stored in a manner associated with program elements to perform the element actions. An action chart is used to describe an operation of the automated manufacturing machine, with one element action having an end linked to a start of another element action using a logical operation. The action chart describing the operation of the automated manufacturing machine is read. The element actions on the action chart are converted into the program elements. The program elements are combined together in accordance with the action chart. This allows automatic generation of a control program for controlling the operation of the automated manufacturing machine.

6 Claims, 12 Drawing Sheets

(58) Field of Classification Search
CPC ...... G05B 2219/36296; G05B 19/4093; G05B 19/0426; G05B 19/4097; G05B 19/042; G05B 19/05; G05B 19/18; G05B 19/4155; B23Q 15/00
See application file for complete search history.

(56) References Cited

U.S. PATENT DOCUMENTS

| | | | |
|---|---|---|---|
| 2004/0216083 A1* | 10/2004 | Biehler | G05B 19/0426 717/102 |
| 2013/0338797 A1* | 12/2013 | Nagata | G05B 15/02 700/9 |
| 2014/0306643 A1 | 10/2014 | Kaku et al. | |
| 2016/0059412 A1 | 3/2016 | Oleynik | |
| 2016/0231733 A1* | 8/2016 | Nagatani | G05B 19/4097 |
| 2017/0017229 A1* | 1/2017 | Keitel | G05B 15/02 |
| 2021/0182101 A1 | 6/2021 | Mizuno et al. | |
| 2022/0350310 A1 | 11/2022 | Yogo et al. | |

FOREIGN PATENT DOCUMENTS

| | | |
|---|---|---|
| JP | H9-091335 A | 4/1997 |
| JP | H11-202912 A | 7/1999 |
| JP | 2011-245602 A | 12/2011 |
| JP | 2018-185772 A | 11/2018 |
| JP | 2018-192570 A | 12/2018 |
| WO | 2015/063925 A1 | 5/2015 |

OTHER PUBLICATIONS

Written Opinion of International Searching Authority issued in PCT/JP2021/002502 mailed on Mar. 30, 2021 with English Translation (7 pages).

Office Action issued in Japanese Patent Application No. 2020-011386 mailed on May 12, 2020, with English Translation (8 pages).

Office Action issued in Japanese Patent Application No. 2020-177114 (Div. of 2022-011386) mailed on Jan. 18, 2020, with English Translation (7 pages).

Extended European Search Report issued in European Patent Application No. 21747397.4, mailed on Feb. 23, 2024 (10 pages).

* cited by examiner

FIG. 12

| Actuator | Element action | Parameter | Program element |
|---|---|---|---|
| AC servomotor Model: AD50 | Ω-AA-1 | A- | MDL-0011053 |
| AC servomotor Model: AF25 | Ω-AA-2 | A- | MDL-0021097 |
| AC servomotor Model: AF25 | Ω-AA-3 | A-, B- | MDL-0200561 |
| AC servomotor Model: AF25 | Ω-AA-4 |  | MDL-1483274 |
| Air cylinder Model: WST10 | Ω-BA-1 | B- | MDL-1987264 |
| Air cylinder Model: WST20 | Ω-BA-2 | B- | MDL-2106383 |
| Air cylinder Model: WTT10 | Ω-BB-1 | A-, B- | MDL-3300104 |
| Air cylinder Model: WTT20 | Ω-BB-2 | A-, B- | MDL-3394458 |
| Hydraulic cylinder Model: VOR150 | Ω-CA-1 |  | MDL-4017283 |
| ⋮ | ⋮ | ⋮ | ⋮ |
| Counter | Ω-CT-1 | N- | MDL-9900011 |
| Timer | Ω-TM-1 | T- | MDL-9900021 |
| ⋮ | ⋮ | ⋮ | ⋮ |

CONTROL PROGRAM GENERATION APPARATUS, CONTROL PROGRAM GENERATION METHOD, AND PROGRAM

CROSS-REFERENCE TO RELATED APPLICATIONS

This application is a continuation application of International Patent Application No. PCT/JP2021/002502 filed on Jan. 25, 2021, which claims priority to Japanese Patent Application No. 2020-011386 filed on Jan. 28, 2020, the entire contents of which are incorporated by reference.

BACKGROUND OF INVENTION

Field of the Invention

The present invention relates to a technique for generating a control program for an automated manufacturing machine including multiple actuators.

Background Art

Labor savings at manufacturing sites such as factories have recently been in focus across many industries, and this trend is expected to increase. Such labor savings at manufacturing sites may be achieved using automated manufacturing machines for automatic operations, such as holding objects to be machined or manufactured, conveying objects, machining objects variously, and heating objects.

Various automated manufacturing machines have been developed depending on the object to be machined or manufactured, the type of machining (e.g., cutting or bending), and the type of heating food (refer to, for example, Patent Literatures 1 and 2).

The size, shape, material, or other features of objects to be machined or manufactured differ at each manufacturing site. The type of machining, the type of heating, or other operational details also differ at each manufacturing site. An automated manufacturing machine used at one manufacturing site can be hardly introduced to another manufacturing site. In many cases, an automated manufacturing machine dedicated to each manufacturing site is to be developed newly.

CITATION LIST

Patent Literature

Patent Literature 1: Japanese Unexamined Patent Application Publication No. 2011-245602
Patent Literature 2: Japanese Unexamined Patent Application Publication No. 2018-192570

SUMMARY OF INVENTION

Technical Problem

Developing a new automated manufacturing machine involves creating a new control program for controlling the automated manufacturing machine. This may obstruct the introduction of a new automated manufacturing machine to a manufacturing site. This occurs for the reasons below.

To develop a new automated manufacturing machine, a machine designer first determines various functions to be included in the automated manufacturing machine, and creates drawings of the automated manufacturing machine to perform such functions. An engineer skilled in creating programs (programmer) then learns the operations of various actuators and machine parts shown in the drawings, and creates the control program to cause the actuators to operate in cooperation to perform the functions to be included.

Creating the control program involves such an expert programmer, and the programmer cannot start programming before the machine designer finished designing the automated manufacturing machine, causing a delay in creating the control program. The programmer also takes time to learn the operations of various actuators and machine parts. This causes a long time to be taken from starting to develop the automated manufacturing machine to its delivery to the manufacturing site, obstructing the introduction of a new automated manufacturing machine to the manufacturing site.

In response to the above issue with the known technique, one or more aspects of the present invention are directed to a technique for automatically generating a control program for an automated manufacturing machine to greatly reduce the time taken to develop a new automated manufacturing machine.

Solution to Problem

In response to the above issue, a control program generation apparatus according to one or more aspects of the present invention is an apparatus described below.

The apparatus is specifically a control program generation apparatus (100) for generating a control program for an automated manufacturing machine (1) including a plurality of actuators (10 to 20). The apparatus (100) includes an element action storage (102), an action chart reader (103), and a control program generator (105). The element action storage (102) stores a plurality of element actions. Each of the plurality of element actions indicates an action with an inherent degree of freedom of a corresponding actuator of the plurality of actuators and has a parameter to be set. Each of the plurality of element actions is associated with a program element to perform the element action. The action chart reader (103) reads an action chart (200) describing an operation of the automated manufacturing machine. The action chart includes the plurality of element actions included in the operation of the automated manufacturing machine. The plurality of element actions include one element action having an end linked to a start of another element action of the plurality of element actions using a logical operation. The control program generator (105) generates the control program to cause the automated manufacturing machine to operate by combining together the plurality of program elements stored in the element action storage in accordance with the action chart.

A control program generation method according to one or more aspects of the present invention corresponding to the above control program generation apparatus is a method described below.

The method is specifically a control program generation method for generating, with a computer, a control program for an automated manufacturing machine (1) including a plurality of actuators (10 to 20). The method includes reading (103) an action chart, analyzing (104) the action chart, and generating (105) the control program. The action chart describes an operation of the automated manufacturing machine using a plurality of element actions and a logical operation. Each of the plurality of element actions indicates an action with an inherent degree of freedom of a corresponding actuator of the plurality of actuators and has a parameter to be set. Each of the plurality of element actions includes one element action having an end linked to a start of another element action of the plurality of element actions using the logical operation. The analyzing (104) the action chart includes analyzing (104) the action chart to extract, from the action chart, the plurality of element actions and the logical operation linking the plurality of element actions. The generating (105) the control program includes generating (105) the control program to cause the automated manufacturing machine to operate by referring to stored data (102) including the plurality of element actions each associated with a program element to perform the element action, converting the plurality of element actions described on the action chart into the plurality of program elements, and combining the plurality of program elements together in accordance with the action chart.

In the control program generation apparatus and the control program generation method according to the aspects of the present invention, the element actions of multiple actuators included in the automated manufacturing machine are prestored in a manner associated with program elements to perform the element actions. The pre-created action chart describes the operation of the automated manufacturing machine. The action chart includes the element actions included in the operation of the automated manufacturing machine. One element action has an end linked to a start of another element action using a logical operation on the action chart. The action chart describing the operation of the automated manufacturing machine is read. The element actions on the action chart are converted into program elements. The program elements are combined together in accordance with the action chart to generate the control program for the automated manufacturing machine.

The element actions of the actuators are simple operations. The program elements to cause the actuators to perform the element actions can thus be pre-created. The machine designer designs and achieves the operation of the automated manufacturing machine by combining the element actions of the actuators. The machine designer who has designed the automated manufacturing machine or an engineer with sufficient knowledge about the structure of the automated manufacturing machine can easily create the action chart describing the operation of the automated manufacturing machine by linking the end of one element action to the start of another element action using a logical operation. The element actions can each have a parameter to be set. The action chart can thus also describe the details of the element actions, such as the movement speed, the rotation speed, the movement distance, or the rotation angle. The control program for controlling the operation of the automated manufacturing machine can thus be generated automatically simply by reading the action chart, converting the element actions on the action chart into program elements, and combining the program elements together in accordance with the action chart.

In the control program generation apparatus according to the above aspect of the present invention, the action chart describing the operation of the automated manufacturing machine may include at least one of a timing action to be performed with a timer or a counting action to be performed with a counter as an operation equivalent to an element action.

The operation of the automated manufacturing machine described on the action chart can thus include, for example, delaying the start of an operation until a predetermined time elapses or until the number of times a predetermined button is pressed reaches a predetermined count.

In the control program generation apparatus according to the above aspect of the present invention, the action chart describing the operation of the automated manufacturing machine may include at least one of a sound output operation to be performed with a speaker or a lighting operation to be performed with an illuminator as an operation equivalent to an element action.

The operation of the automated manufacturing machine described on the action chart can thus include, for example, activating an actuator after outputting a sound effect or other sound from the speaker or after turning on or flashing the illuminator.

In the control program generation apparatus according to the above aspect of the present invention, the action chart describing the operation of the automated manufacturing machine may include a heating action to be performed with a heater as an operation equivalent to an element action.

The operation of the automated manufacturing machine described on the action chart can thus include, for example, heat-treating metal material or cooking food.

In the control program generation apparatus according to the above aspect of the present invention, the plurality of actuators may include a sequence-controlled actuator controllable under sequence control. The element action of the sequence-controlled actuator may be stored in a manner associated with a program element to perform the element action of the sequence-controlled actuator under the sequence control. The plurality of actuators may include a servo-controlled actuator controllable under servo control. The element action of the servo-controlled actuator may be stored in a manner associated with a program element to perform the element action of the servo-controlled actuator under the servo control.

For an automated manufacturing machine including both a sequence-controlled actuator and a servo-controlled actuator, the operation can be described on the action chart and the control program can be generated automatically.

The above control program generation method according to one or more aspects of the present invention may also be implemented as a program for causing a computer to perform the control program generation method. The program according to one or more aspects of the present invention is specifically a program for causing a computer to implement a method for generating a control program for an automated manufacturing machine (1) including a plurality of actuators (10 to 20). The program may be stored in a non-transitory computer-readable storage medium. The program causes the computer to perform operations including reading (103) an action chart, analyzing (104) the action chart, and generating (105) the control program. The action chart describes an operation of the automated manufacturing machine using a plurality of element actions and a logical operation. Each of the plurality of element actions indicates an action with an inherent degree of freedom of a corresponding actuator of the plurality of actuators and has a parameter to be set. Each of the plurality of element actions includes one element action having an end linked to a start of another element action of the plurality of element actions using the logical operation. The analyzing (104) the action chart includes analyzing (104) the action chart to extract, from the action chart, the plurality of element actions and the logical operation linking the plurality of element actions. The generating (105) the control program includes generating (105) the control program to cause the automated manufacturing machine to operate by referring to stored data (102) including the plurality of element actions each associated with a program element to perform the element action, converting the plurality of element actions described on the action chart into the plurality of program elements, and combining the plurality of program elements together in accordance with the action chart.

The program can be loaded and executed by the computer to automatically generate the control program for controlling the operation of the automated manufacturing machine from the action chart.

BRIEF DESCRIPTION OF THE DRAWINGS

FIG. 12 is an example table including element actions associated with program elements stored in the control program generation apparatus 100 according to the present embodiment.

DETAILED DESCRIPTION

A. Apparatus Structure

Figure 1:
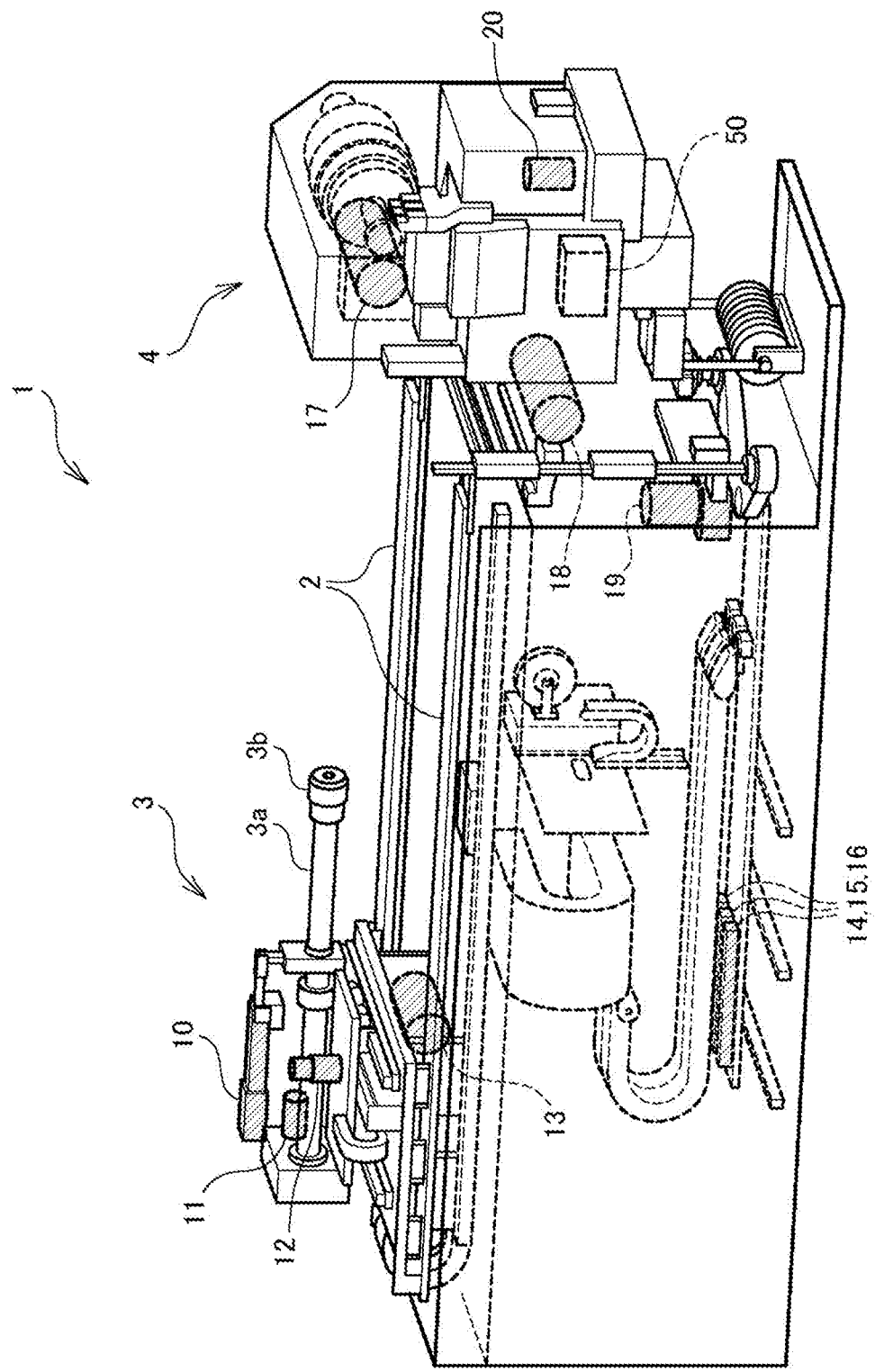
FIG. 1 is an external view of an automated manufacturing machine 1 controllable with a control program generated by a control program generation apparatus 100 according to an embodiment.

FIG. 1 is a general external view of an automated manufacturing machine 1 in the present embodiment. The automated manufacturing machine 1 in the present embodiment is an equipment of a machine tool (pipe bender machine) for automatically bending a long pipe into an intended shape. The automated manufacturing machine 1 in the present embodiment may be other than a pipe bender machine and may be any manufacturing machine that incorporates multiple actuators and automatically performs multiple operations such as holding, conveying, machining, or heating objects. The automated manufacturing machine 1 may be, for example, an automated food manufacturing machine, or may be a manufacturing system combining a multi joint robotic arm with a conveyor.

As shown in FIG. 1, the automated manufacturing machine 1 in the present embodiment is externally in the shape of a substantially horizontal rectangular prism. The automated manufacturing machine 1 includes two rails 2 extending lengthwise over the upper surface of the rectangular prism. The automated manufacturing machine 1 incorporates a conveyor unit 3 for holding and conveying a pipe to be machined (not shown) at one end (left in FIG. 1) of the rails 2. The automated manufacturing machine 1 incorporates a machining unit 4 at the end opposite to the conveyor unit 3. The machining unit 4 is used for machining, such as bending, of the pipe (not shown). The conveyor unit 3 includes a protruding cylindrical holder shaft 3a with a chuck 3b attached to its distal end for holding the pipe (not shown). The conveyor unit 3 is moved on the rails 2 with the chuck 3b holding the pipe to supply the pipe to the machining unit 4, which can then bend or otherwise machine the pipe.

The automated manufacturing machine 1 in the present embodiment can control the movement distance of the conveyor unit 3 and thus the conveying distance of the pipe. The position on the pipe to be machined or for example bent can thus be controlled as appropriate. The holder shaft 3a with the chuck 3b can be turned (twisted) about its axis to bend the pipe in an intended direction. To achieve the above operations, the conveyor unit 3 incorporates an actuator 10 for opening and closing the chuck 3b, an actuator 11 for turning the holder shaft 3a about its axis, an actuator 12 for axially moving the holder shaft 3a forward or backward, and an actuator 13 for moving the conveyor unit 3 forward or backward on the rails 2. In the automated manufacturing machine 1 in the present embodiment, the actuators 10 to 13 are all servomotors actable on alternating current power. However, the automated manufacturing machine 1 may include actuators with other driving schemes (e.g., hydraulic cylinders, solenoids, or stepper motors) as appropriate for the intended performance of the actuators. The conveyor unit 3 also incorporates sensors such as encoders and limit switches for detecting the rotational position of the holder shaft 3a and the movement position of the conveyor unit 3. Such sensors are not shown in FIG. 1 to avoid complexity in the figure.

The machining unit 4 incorporates an actuator 17 for bending a pipe, an actuator 18 for changing the position on the pipe to which a force is applied for bending the pipe, an actuator 19 for vertically moving the entire machining unit 4, and an actuator 20 for forming a flat end surface (or a flange) or an annular protrusion (or a bulge) on the pipe. The machining unit 4 also incorporates switches and sensors such as contact switches and encoders. The switches and sensors are not shown to avoid complexity in the figure.

The machining unit 4 also incorporates a control computer 50 (e.g., including one or more processors and data storage) for controlling the overall operation of the automated manufacturing machine 1, and multiple driver circuits (not shown) for driving the above actuators 10 to 13 and 17 to 20. The driver circuits are electrical components with the functions below. To act as intended, the actuators 10 to 13 and 17 to 20 are to receive drive currents with appropriate waveforms. The drive currents to be supplied to the actuators 10 to 13 and 17 to 20 differ depending on their driving schemes. Although actuators are driven with the same driving scheme, these actuators may be driven with different drive current values. The machining unit 4 thus includes electrical components, or driver circuits, designed specifically for the actuators 10 to 13 and 17 to 20. The driver circuits output appropriate drive currents to the actuators 10 to 13 and 17 to 20 for driving these actuators at levels specified by the control computer 50.

As shown in FIG. 1, the space below the two rails 2 accommodates various machine parts. The space accommodates electrical cables (not shown) for supplying drive currents from the multiple driver circuits (not shown) in the machining unit 4 to the actuators 10 to 13 in the conveyor unit 3, and signal cables (not shown) for transmitting signals from the switches and sensors in the conveyor unit 3 to the machining unit 4. The electrical cables and the signal cables move in the space as the conveyor unit 3 moves forward or backward on the rails 2, possibly being entangled or caught on any component. To avoid such a situation, the space below the rails 2 also accommodates the actuators 14 to 16. For the electrical cables and the signal cables having any unintended play, the actuators 14 to 16 pull the cables to eliminate the play. For the electrical cables and the signal cables being tensioned with a strong force, the actuators 14 to 16 loosen the cables to provide appropriate play. In the automated manufacturing machine 1 in the present embodiment, the actuators 14 to 16 are air cylinders operable under control by the control computer 50 with driver circuits (not shown).

As described above, the automated manufacturing machine 1 incorporates the many actuators 10 to 20. To automatically machine an object (a pipe in this example) into an intended shape, the actuators 10 to 20 are to act timely and appropriately. The actuators 10 to 20 are driven by their respective driver circuits. The driver circuits drive the respective actuators 10 to 20 in accordance with the control program preloaded by the control computer 50.

Figure 2:
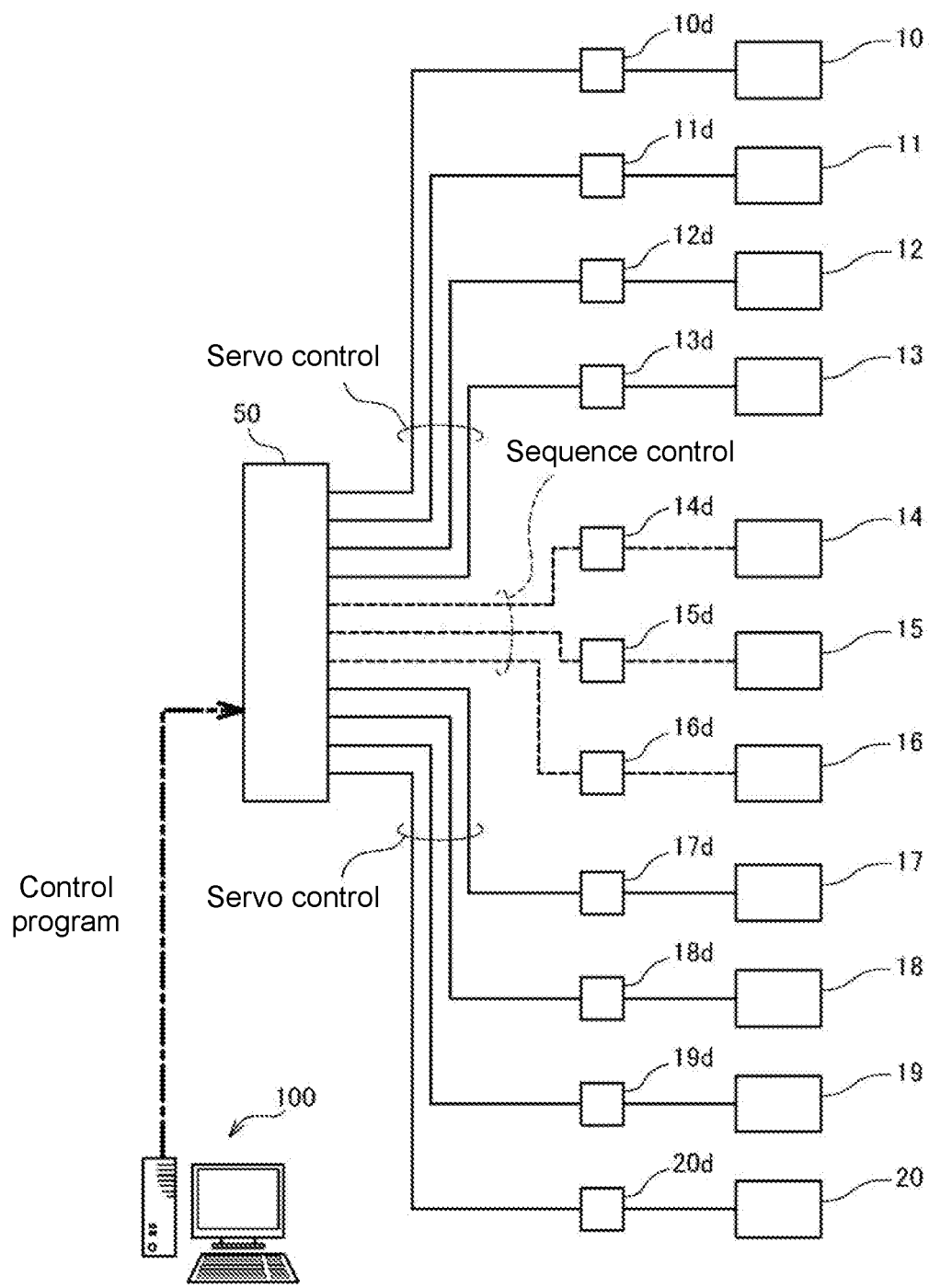
FIG. 2 is a conceptual block diagram of a control computer 50 incorporated in the automated manufacturing machine 1 and controlling the actions of actuators 10 to 20 incorporated in the automated manufacturing machine 1.

FIG. 2 is a conceptual block diagram of a control computer 50 incorporated in the automated manufacturing machine 1 and controlling the actions of the actuators 10 to 20. In FIG. 2, the switches and sensors used for the control are not shown. As shown in the figure, a driver circuit 10d for driving the actuator 10 is between the actuator 10 and the control computer 50. The control computer 50 directly controls the driver circuit 10d. For the actuators 11 to 20 as well, driver circuits 11d to 20d for driving the respective actuators 11 to 20 are between the actuators 11 to 20 and the control computer 50. The control computer 50 indirectly controls the actions of the actuators 11 to 20 with the driver circuits 11d to 20d.

As described above with reference to FIG. 1, the automated manufacturing machine 1 in the present embodiment includes the actuators 10 to 13 and 17 to 20 being servomotors and the actuators 14 to 16 being air cylinders. The servomotors herein are servo-controlled motors that typically regulate the values of current through the motors by feedback control to cause the positions (or the angles, speeds, or other parameters) to have target values. The air cylinders herein are actuators that linearly move their actable parts using air pressure and operate by opening and closing the ports connected to sources of compressed air. The ports are open and closed under sequence control.

The servo-controlled actuators 10 to 13 and 17 to 20 and the sequence-controlled actuators 14 to 16 are thus connected to the control computer 50. In the figure, the solid lines connecting the actuators 10 to 13 and 17 to 20 to the control computer 50 indicate the actuators 10 to 13 and 17 to 20 being servo-controlled. In the figure, the dashed lines connecting the actuators 14 to 16 to the control computer 50 indicate the actuators 14 to 16 being sequence-controlled. Actuators controlled with any scheme other than servo control or sequence control may also be connected to the control computer 50.

The control computer 50 controls the actions of the actuators 10 to 20 with the driver circuits 10d to 20d in accordance with the control program. The control program is pre-created with the control program generation apparatus 100 and preloaded into the control computer 50. The control program is to allow timely and appropriate actions of the many actuators 10 to 20 as shown in FIG. 2. Such a control program cannot be easily created. For a machine including actuators with different control schemes, such as servo- and sequence-controlled actuators, in particular, creating the control program takes a long time. Developing a new automated manufacturing machine 1 thus involves creating the control program that uses a half or more of the development period in the present situation.

B. Creating Control Program

B-1. Overview

Figure 3:
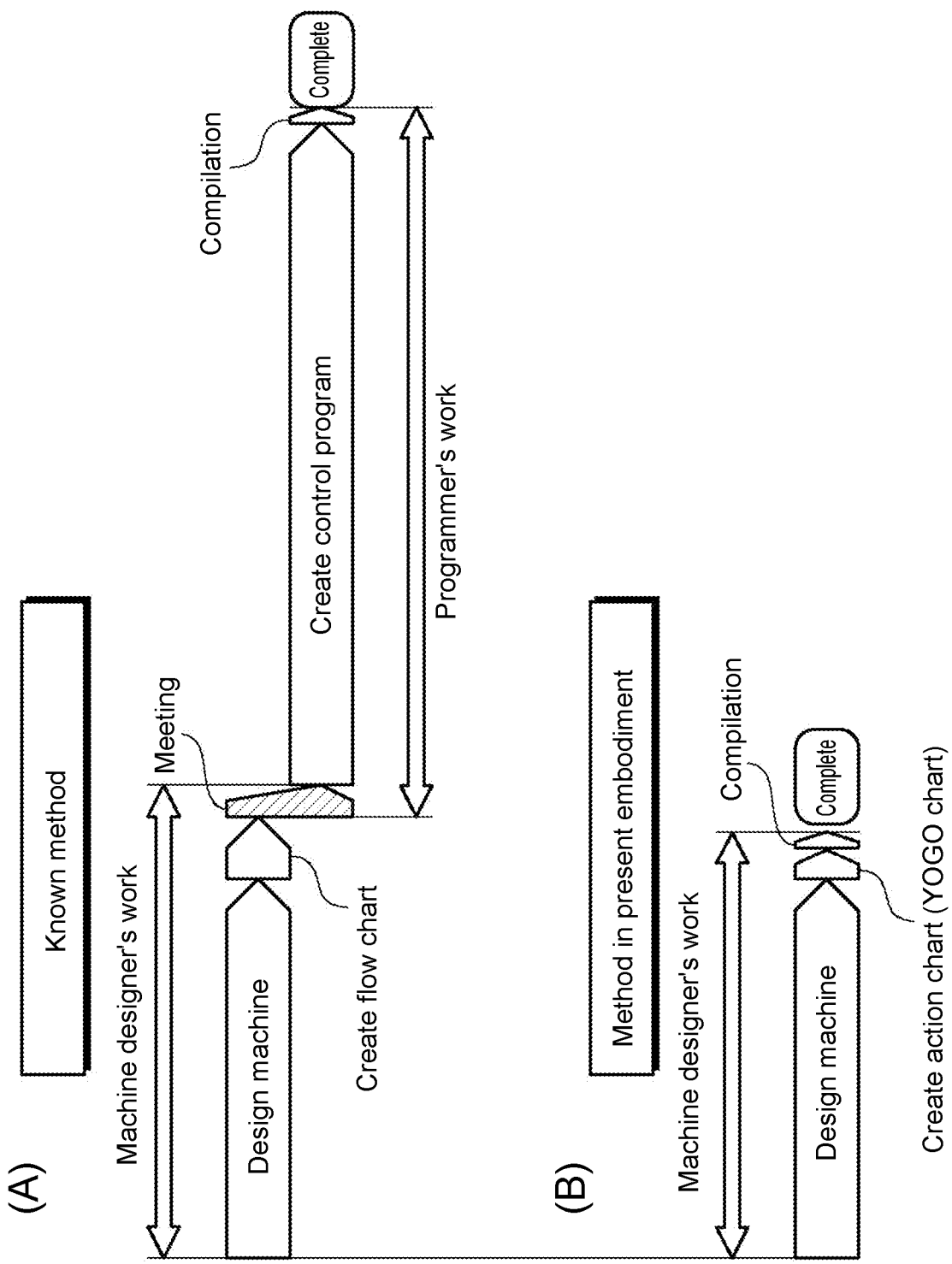
FIG. 3 shows diagrams showing general processes for developing a new automated manufacturing machine 1.

FIG. 3 shows conceptual diagrams showing general processes for developing a new automated manufacturing machine 1. (A) of FIG. 3 shows a known development process. (B) of FIG. 3 shows a new development process presented by the inventor of the present application.

In the known development process, as shown in (A) of FIG. 3, the machine designer first determines various functions to be included in the automated manufacturing machine 1, and creates drawings of the automated manufacturing machine 1 with the structure for performing the functions. To create the drawings, the machine designer determines individual features including the types of actable parts to be included, the intended actions of the actable parts, and the details of actuators for achieving the intended actions including the torque, ranges of motion, precision, locations, and number of such actuators. The machine designer then determines the actuators to be incorporated and finally completes the drawings after considering, for example, the ease of incorporation and maintenance of the actuators.

Once the automated manufacturing machine 1 is designed, a control program for controlling the automated manufacturing machine 1 is created. Creating the control program involves an engineer expert in software (in other words, a programmer). Once completing the machine design, the machine designer creates a flowchart describing the actions of the actuators incorporated in the designed automated manufacturing machine 1. The machine designer then has a meeting with the programmer to explain the actions of the actuators. This completes the machine designer's work.

At the meeting with the machine designer, the programmer learns the actions of the actuators incorporated in the automated manufacturing machine 1 by carefully reading the flowchart, drawings, and other materials as appropriate created by the machine designer. The programmer then starts creating the control program for controlling the actions of the various actuators. The programmer typically creates the control program using a human-readable, high-level programming language. The control program written in the high-level programming language is not computer-executable. The programmer converts the control program written in the high-level programming language into a computer-executable control program written in a machine language to complete the final control program. The conversion, or also referred to as compilation, of the control program written in the high-level programming language into the computer-executable control program can be complete in a short time using a dedicated program, or a compiler.

In the known development process, as illustrated in (A) of FIG. 3, creating the control program typically takes about 1.5 to 2.5 times more time than designing the machine. Most processes of designing the machine and creating the control program are difficult to perform in parallel, thus prolonging the development period of the automated manufacturing machine 1. The known development process involves experts with different skills, the machine designer and the programmer. This may also obstruct the development of a new automated manufacturing machine 1.

(B) of FIG. 3 shows a process for developing the automated manufacturing machine 1 with a new method presented by the inventor of the present application. The new method is similar to the known method in the machine design. More specifically, the machine designer first determines various functions to be included in the automated manufacturing machine 1, and creates drawings of the automated manufacturing machine 1 with the structure for performing the functions. The machine designer determines the actuators after determining, for example, the actable parts to be included for performing the functions, the actions of the actable parts, and the performance of the actuators for acting the actable parts. The machine designer then finally completes the drawings after considering, for example, the ease of incorporation and maintenance of the actuators.

In the new development process, the machine designer creates an action chart instead of a flowchart after completing the drawings (refer to (B) of FIG. 3). The action chart (described in detail later) describes the actions of the actuators determined by the machine designer designing the machine. The action chart is conceived by the inventor of the present application. This new action chart is hereafter referred to as a YOGO chart. The YOGO chart in the present embodiment corresponds to an action chart in one or more aspects of the present invention.

As described later, the YOGO chart simply describes the actions of the actuators determined by the machine designer designing the machine. The machine designer who has designed the machine can create the YOGO chart in about half the time taken for creating a flowchart (refer to (B) of FIG. 3). The YOGO chart can be read using a dedicated program and converted into a control program executable by the CPU in the computer. The mechanism for converting the YOGO chart into a control program is also described later. The YOGO chart describing the operation of the automated manufacturing machine 1 can be used to generate the control program written in a machine language. This method can reduce the development period for a new automated manufacturing machine 1 to half or less (typically to about one-third) as compared with the known method, as shown in FIG. 3. The YOGO chart can also be easily created by the machine designer without the work to be performed by the programmer. Various matters that may obstruct the development of a new automated manufacturing machine 1 can thus be mostly eliminated. The YOGO chart achieving these will now be described.

B-2. YOGO Chart

Figure 4:
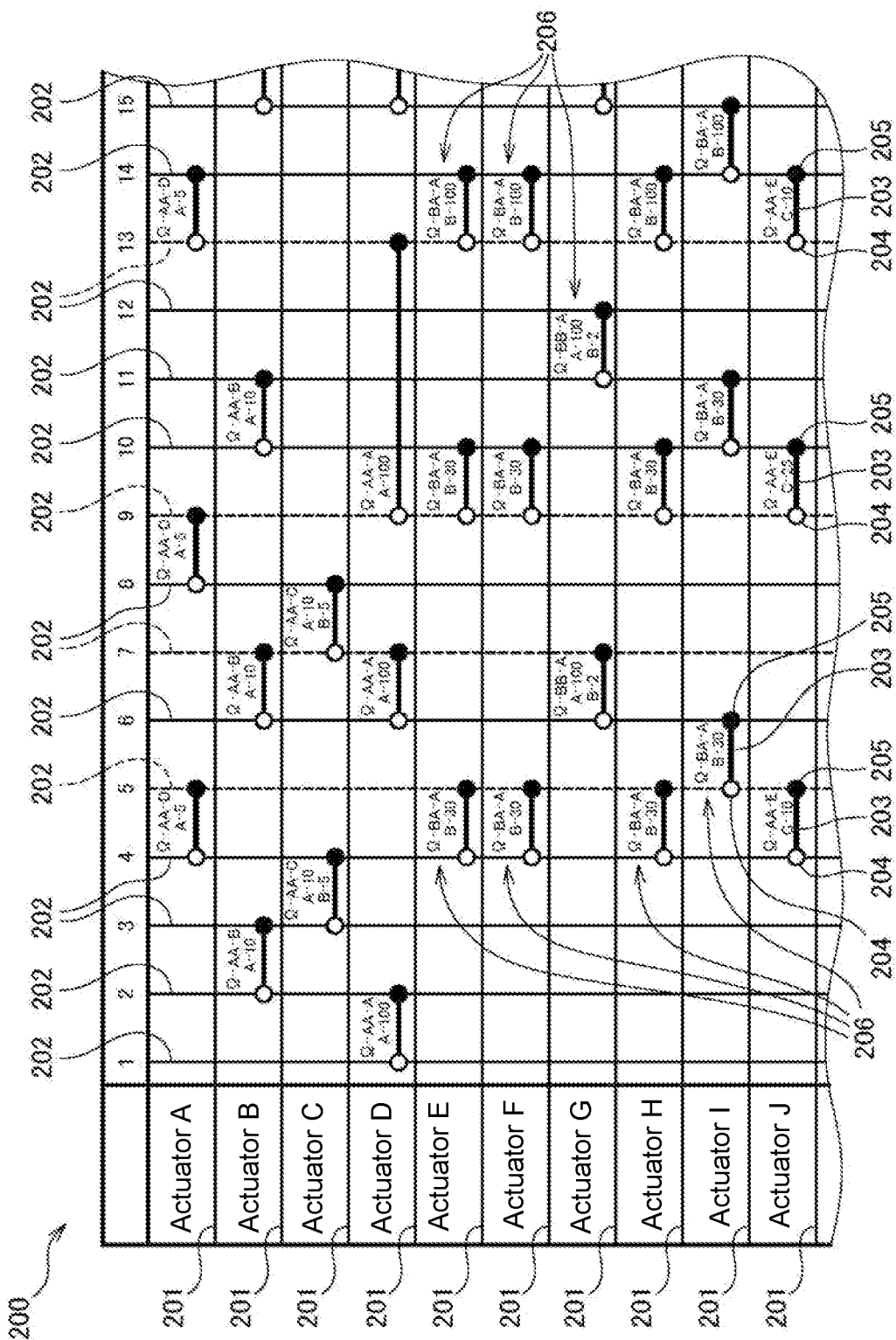
FIG. 4 is an example schematic action chart (YOGO chart) read by the control program generation apparatus 100 according to the present embodiment.

FIG. 4 schematically shows the YOGO chart 200 in the present embodiment. FIG. 4 shows a part (the upper left corner) of the YOGO chart 200 to avoid scaling down and showing the entire chart being unreadable. As shown in FIG. 4, the YOGO chart 200 is a large table with multiple horizontal lines and multiple vertical lines intersecting with each other. The horizontal lines of the multiple intersecting lines are referred to as separation lines 201, and the vertical lines are referred to as trigger lines 202.

In each horizontal area defined by adjacent separation lines 201, the action of the corresponding actuator is described. The YOGO chart 200 lists the names of the actuators between the separation lines 201 in the leftmost field. Each horizontal area defined by the separation lines 201 includes the action of the corresponding actuator listed in the leftmost field. In the example of FIG. 4, the action of the actuator A is described in the top horizontal area, the action of the actuator B is described in the second horizontal area from the top, and the action of the actuator C is described in the third horizontal area from the top. As described above with reference to FIGS. 1 and 2, the automated manufacturing machine 1 in the present embodiment incorporates the eleven actuators 10 to 20 each assigned with a horizontal area. As described later, the YOGO chart 200 can also describe the actions of devices other than the actuators. Such devices are also each assigned with a horizontal area.

The trigger lines 202 are given serial numbers. In the example of FIG. 4, the top field of the YOGO chart 200 includes the serial numbers of the trigger lines 202. The trigger lines 202 are used in generating the control program written in a machine language by referring to the YOGO chart 200. This will be described in detail later.

Each area defined by the separation lines 201 includes action lines 203 each indicating the action of the actuator assigned to that area. Each action line 203 has a start point 204 at the left end to indicate the start of the action and an end point 205 at the right end to indicate the end of the action. In the example of FIG. 4, the action lines 203 are thick solid lines, the start points 204 are outlined circles, and the end points 205 are solid circles. Each action line 203 is to be within an area defined by the separation lines 201 without extending beyond the separation lines 201. Although the action lines 203 may extend beyond the trigger lines 202, the start points 204 and the end points 205 are to be on the trigger lines 202.

An element action 206 of the actuator is written above each action line 203. For a rotary actuator such as a motor, the element action of the actuator refers to, for example, a forward or backward rotation motion. For a linear actuator such as an air cylinder, the element action of the actuator refers to, for example, a forward or backward linear motion. The element action can have a parameter to be specified to define the action of the actuator. The parameter may be, for example, the rotation speed, the movement speed, or the action time. In the present embodiment, the forward rotation motion and the backward rotation motion are two element actions with different degrees of freedom. However, the forward and backward rotation motions may be referred to as a single element action with the same degree of freedom and with their parameters having different signs, plus and minus. The YOGO chart 200 thus describes the operation of the automated manufacturing machine 1 using, for example, the separation lines 201, the trigger lines 202, the action lines 203, the start points 204, the end points 205, and the element actions 206.

Figure 5:
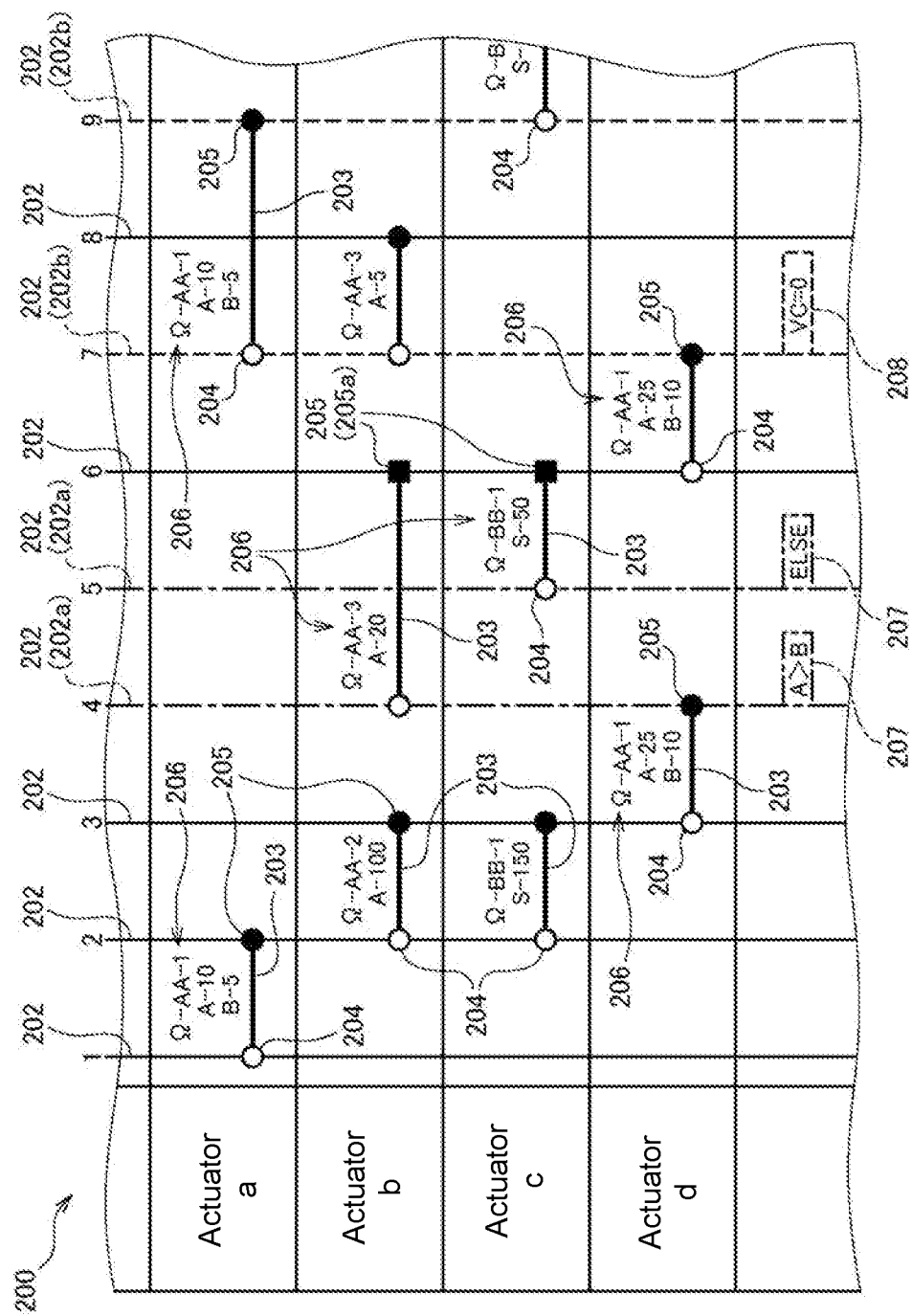
FIG. 5 is the action chart (YOGO chart) showing a method for describing an operation of the automated manufacturing machine 1.

FIG. 5 is the YOGO chart 200 showing a method for describing the operation of the automated manufacturing machine 1. FIG. 5 is an example chart describing four actuators a to d acting in cooperation. The number-1 trigger line 202 includes the start point 204 in the area in which the action of the actuator a is described. The action line 203 extends rightward from the start point 204. The number-1 trigger line 202 indicates the time at which the automated manufacturing machine 1 is powered on. This indicates that the actuator a is first activated in response to the automated manufacturing machine 1 being powered on.

The element action 206 (Ω-AA-1) is written with two parameters A-10 and B-5 above the action line 203. As described later, the element action 206 is associated with the program element executable by the computer to cause the actuator a to perform the element action. The element action 206 written above the action line 203 can be used to identify the program element executable by the computer. The program element is then used to control the action of the actuator a, allowing the actuator a to perform the element action 206.

The actuator a may be, for example, an air cylinder that performs a simple action such as moving forward or backward to the stroke limit. In this case, the element action to be performed with the program element may be to simply move forward or backward until a predetermined time elapses or until the contact switch is turned on. Such a simple action can be defined without any parameter, and the element action 206 is written above the action line 203 without any parameter. The actuator may be, for example, a linear motor that moves forward or backward with its speed or distance of movement (or the stop position) specifiable. Such conditions are to be specified for the program element. The actuator may be, for example, a typical motor that rotates forward or backward with its speed or angle of rotation (or the stop angular position) specifiable. Such conditions are to be specified for the program element. For such actuators, the element action 206 is written above the action line 203 with the parameter specifying any of the above conditions. The condition to be specified by the parameter is not limited to a numerical value indicating the speed or position, but may be the degree of acceleration or deceleration of the motor or the drive pattern indicating the manner of acceleration or deceleration.

For the actuator a in FIG. 5, the action line 203 extends from the start point 204 on the number-1 trigger line 202 to the end point 205 on the number-2 trigger line 202. This indicates that the actuator a starts acting in response to power-on and completes the action at the time indicated by the number-2 trigger line 202. The elapsed time from the time indicated by the number-1 trigger line 202 to the time indicated by the number-2 trigger line 202 depends on the program element specified by the element action 206 written above the action line 203.

The number-2 trigger line 202 includes the start point 204 at the position corresponding to the actuator b. The action line 203 extends from this start point 204 to the end point 205 on the number-3 action line 203. Similarly, the number-2 trigger line 202 includes the start point 204 at the position corresponding to the actuator c. The action line 203 extends from this start point 204 to the end point 205 on the number-3 trigger line 202. These indicate that the actuator b and the actuator c start acting upon completion of the element action 206 (Ω-AA-1) of the actuator a. The action of the actuator b is the element action 206 (Ω-AA-2) written above the corresponding action line 203. The action of the actuator c is the element action 206 (Ω-BB-1) written above the corresponding action line 203.

The number-3 trigger line 202 includes the start point 204 at the position corresponding to the actuator d. The action line 203 extends from this start point 204 to the end point 205 on the number-4 trigger line 202. The element action 206 (Ω-AA-1) is written above the action line 203. This indicates that the actuator d starts acting upon completion of the actions of the actuator b and the actuator c. The action of the actuator b is the element action 206 (Ω-AA-2). The action of the actuator c is the element action 206 (Ω-BB-1). The actions of the actuator b and the actuator c may not be complete at the same time. The actuator d starts the element action 206 (Ω-AA-1 in this example) upon completion of the actions of both the actuator b and the actuator c.

The function of the trigger lines 202 will now be described. The trigger lines 202 may intuitively represent the action timing. However, the trigger lines 202 are actually not intended to indicate the action timing. For example, the action lines 203 for the above actuator b and the actuator c are complete at the end points 205 on the number-3 trigger line 202. However, the actuator b and the actuator c actually have different actional details and may not complete their actions at the same time. Thus, each trigger line 202 links the end of the action of one or more actuators to the start of the action of one or more other actuators using a logical operation. In the above example, the number-3 trigger line 202 links the condition that the actuator b has completed the action, the condition that the actuator c has completed the action, and the condition that the actuator d starts the action to one another using the logical operation "the actuator b has completed the action" AND "the actuator c has completed the action"="the actuator d starts the action".

As described above, the YOGO chart 200 describes the overall operation of the automated manufacturing machine 1 by linking the element actions of multiple actuators to each other using logical operations. Any chart that achieves this function, possibly without the action lines 203, the start points 204, the end points 205, or the separation lines 201 or the trigger lines 202, can be a variation of the YOGO chart 200.

Figure 6A:
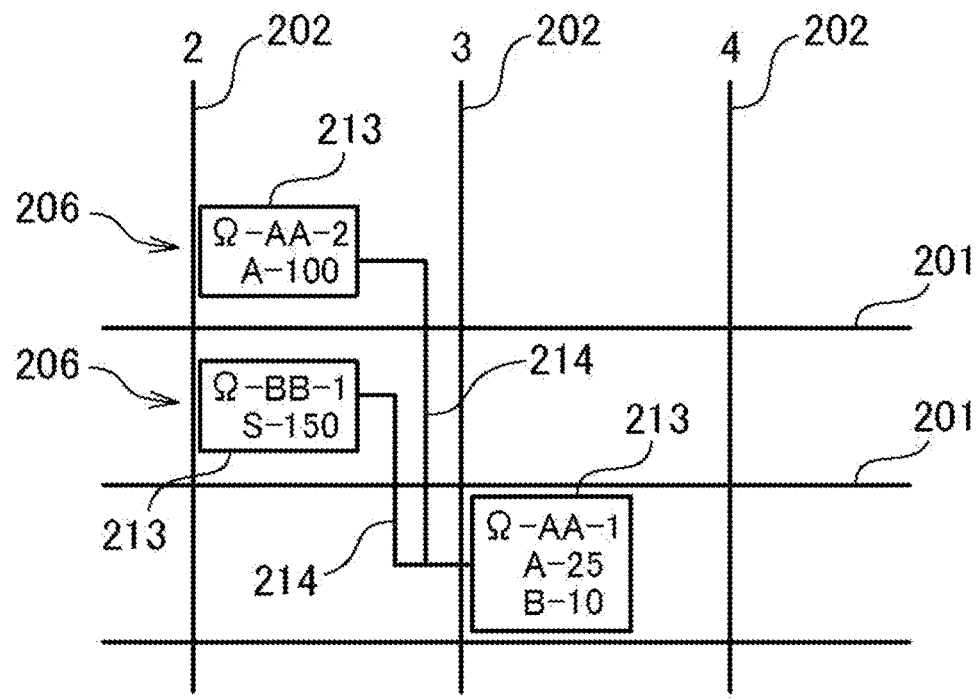
FIGS. 6A and 6B are action charts (YOGO charts) in other embodiments, showing an example method for describing the operation of the automated manufacturing machine 1.
Figure 6B:
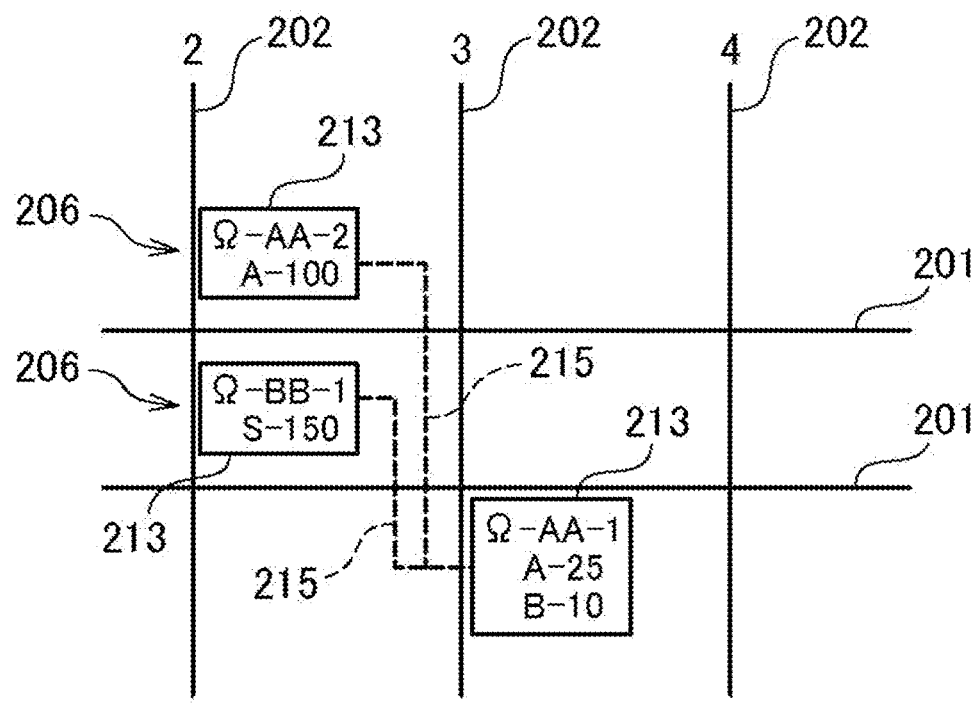

FIGS. 6A and 6B are action charts (variations of the YOGO chart) functioning similarly to the YOGO chart, showing an example description of the operation of the automated manufacturing machine 1. The variations of the YOGO chart in FIGS. 6A and 6B include rectangular action blocks 213 instead of the action lines 203 described above. Each action block 213 indicates that the actuator is to operate, and the actional details of the actuator are defined by the element action 206 written in the action block 213. The action indicated by an action block 213 may have its end connected to the start of the action indicated by another action block 213 using a line indicating a logical operation to link these actions to each other.

For example, FIG. 6A is a variation of the YOGO chart describing the number-3 trigger line 202 and its adjacent area shown in FIG. 5. FIG. 6A shows, at the position of the number-2 trigger line 202, the action block 213 including the element action 206 (Ω-AA-2) and the action block 213 including the element action 206 (Ω-BB-1). FIG. 6A also shows, at the position of the number-3 trigger line 202, the action block 213 including the element action 206 (Ω-AA-1). The two action blocks 213 written at the number-2 trigger line 202 each have the end connected to the start of the action block 213 written at the number-3 trigger line 202 using an AND line 214 being a solid line in the figure. The AND lines 214 indicate that the action blocks 213 are linked to one another using a logical AND operation. This chart thus describes an action in which the element action 206 (Ω-AA-1) starts upon completion of both the element action 206 (Ω-AA-2) and the element action 206 (Ω-BB-1).

The action blocks 213 may be linked to one another using a logical OR operation, instead of the logical AND operation. As shown in FIG. 6B, for example, the action block 213 indicating the element action 206 (Ω-AA-2) and the action block 213 indicating the element action 206 (Ω-BB-1) are each connected to the action block 213 indicating the element action 206 (Ω-AA-1) using an OR line 215 being a dashed line in the figure. This chart thus describes an action in which the element action 206 (Ω-AA-1) starts upon completion of either the element action 206 (Ω-AA-2) or the element action 206 (Ω-BB-1).

As described above, the trigger lines 202 on the YOGO chart 200 are to link the element actions of multiple actuators to each other using logical operations. An actuator can have its action yet to be fully complete but determined to be complete to cause the next actuator to start acting in response to a predetermined condition being satisfied.

Figure 7:
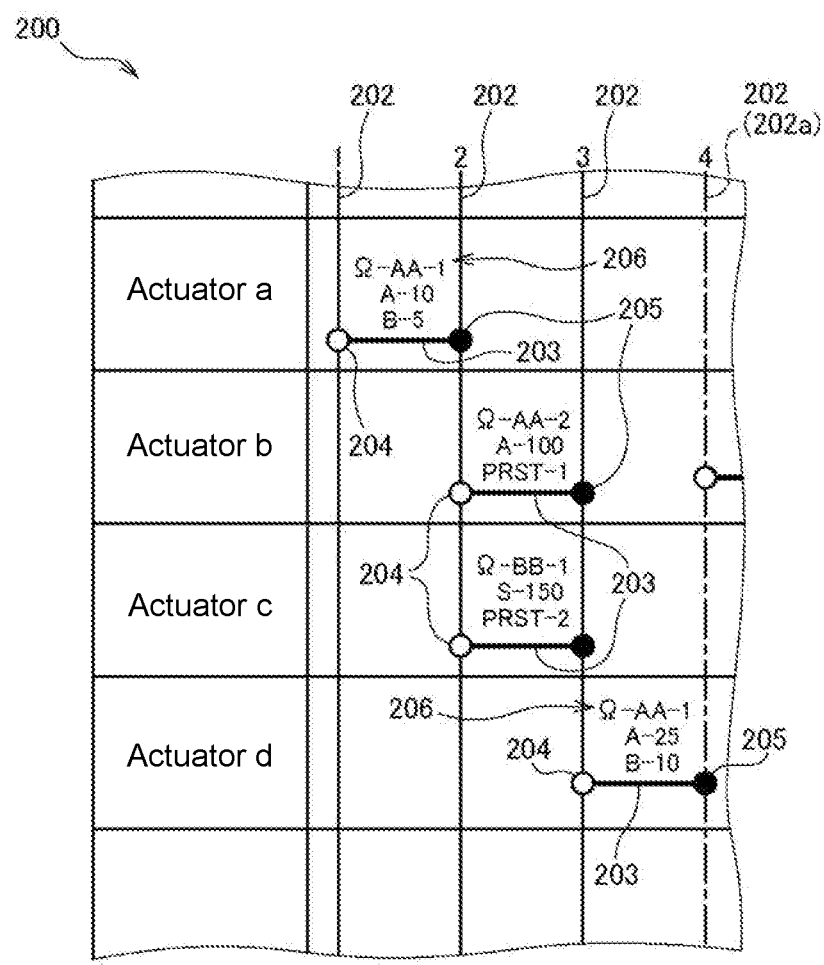
FIG. 7 is an example YOGO chart 200 describing an actuator with its action yet to be complete but determined to be complete to cause the next actuator to start acting.

FIG. 7 is an example YOGO chart 200 showing an actuator with its action yet to be complete but determined to be complete to cause the next actuator to start acting. Unlike the YOGO chart 200 in FIG. 5, the YOGO chart 200 in FIG. 7 includes parameters PRST-1 and PRST-2 set for the element actions 206 for the actuator b and the actuator c, respectively. In this example, the element action 206 (Ω-AA-2) set for the actuator b is a rotation motion, and the rotation angle is defined by a parameter A-100. The element action 206 (Ω-BB-1) set for the actuator c is a forward or backward motion, and the movement distance is defined by a parameter S-150. The parameter PRST-1 set for the element action 206 allows the actuator b to have its action determined to be complete before the rotation angle reaches the angle defined by A-100. The parameter PRST-2 set for the element action 206 allows the actuator c to have its action determined to be complete before the movement distance reaches the distance defined by S-150.

For the angle defined by the parameter A-100 being 100 degrees and the angle defined by the parameter PRST-1 being 10 degrees, for example, the actuator b has its action determined to be complete in response to the rotation angle reaching 90 degrees (=100−10). For the movement distance defined by the parameter S-150 being 150 mm and the movement distance defined by the parameter PRST-2 being 5 mm, for example, the actuator c has its action determined to be complete in response to the movement distance reaching 145 mm (=150−5). With the actuator b having the rotation angle reaching 140 degrees and the actuator c having the movement distance reaching 145 mm, the actuator d can start acting when the actuator b or c is actually still acting.

The basic method for describing the operation of the automated manufacturing machine 1 using the YOGO chart 200 has been described above. To describe the operation more easily, various description methods are available for the YOGO chart 200. In FIG. 5, for example, the number-4 trigger line 202 and the number-5 trigger line 202 are dot-and-dash lines to indicate conditional branching. Boxes 207 at the lower part of the number-4 trigger line 202 and the number-5 trigger line 202 are also in dot-and-dash lines to indicate branch conditions. In the example of FIG. 5, A>B is written in the box 207 at the lower part of the number-4 trigger line 202, and ELSE is written in the box 207 at the lower part of the number-5 trigger line 202. This indicates that the action indicated by the action line 203 extending from the start point 204 on the number-4 trigger line 202 starts in response to A>B being satisfied, and the action indicated by the action line 203 extending from the start point 204 on the number-5 trigger line 202 starts in response to A>B not being satisfied (ELSE). In response to the actuator d completing the element action 206 (Ω-AA-1) and A>B being satisfied, the actuator b starts the element action 206 (Ω-AA-3). In response to the actuator d completing the element action 206 (Ω-AA-1) and A>B not being satisfied, the actuator c starts the element action 206 (Ω-BB-1).

The action of the actuator b that has started is complete at the end point 205. The action of the actuator c is complete at the end point 205. These end points 205 are indicated by solid squares. Each solid square indicates that the end of the action is linked to the start of another operation using a logical OR operation. The other end points 205 indicated by solid circles each connect the end of an action to the start of another action using an AND operation. The end points 205 indicated by solid squares may also be referred to as OR end points 205*a* to be distinguished from the other end points 205 indicated by solid circles. In the example of FIG. 5, the element action 206 (Ω-AA-3) of the actuator b and the element action 206 (Ω-BB-1) of the actuator c are both complete on the number-6 trigger line 202. Upon completion of either of these actions, the actuator d starts the element action 206 (Ω-AA-1).

The action of the actuator d that has started is complete at the end point 205 on the number-7 trigger line 202 being a dashed line in the figure. The dashed trigger lines 202 indicate an action or actions to be repeated. In the example of FIG. 5, the actions from the dashed number-7 trigger line 202 to the dashed number-9 trigger line 202 are repeated. The condition for repetition is written in a dashed line box 208 at the lower part of the number-7 trigger line 202 with the lower number of the two trigger lines 202. In the example of FIG. 5, the actions from the number-7 trigger line 202 to the number-9 trigger line 202 (specifically, the actions of the actuator a and the actuator b) are repeated until a variable VC reaches zero. In response to the condition for repetition (variable VC=0 in this example) written at the lower part of the number-7 trigger line 202 being satisfied, the actuator c with its start point 204 on the number-9 trigger line 202 starts acting.

The automated manufacturing machine 1 may indicate the start of the actions of the actuators by outputting sound (including a sound effect) to alert nearby workers or by turning on or flashing an illuminator for a predetermined duration. Outputting sound from the speaker and turning on or flashing the illuminator are not performed by the actuators but may be defined to be equivalent to the element actions. The YOGO chart 200 can also describe the actions that are not performed by the actuators but are defined to be equivalent to the element actions.

Figure 8A:
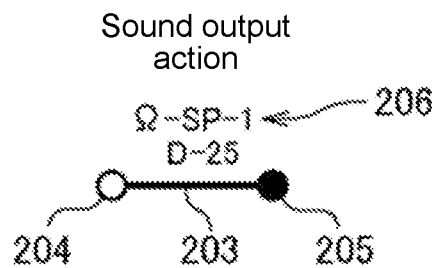
FIGS. 8A, 8B, 8C, 8D, and 8E are diagrams showing example descriptions of actions defined to be equivalent to element actions on the action chart (YOGO chart).

FIGS. 8A to 8E are diagrams showing example descriptions of actions defined to be equivalent to the element actions described on the YOGO chart 200. FIG. 8A describes an action of outputting sound from a speaker (sound output operation). On the YOGO chart 200, the sound output action to be performed with the speaker is also described using the action line 203 having the start point 204 at the left end and the end point 205 at the right end, with the element action 206 (Ω-SP-1 in this example) written above the action line 203 to indicate the drive of the speaker. The sound data to be output from the speaker can be specified using a parameter.

Figure 8B:
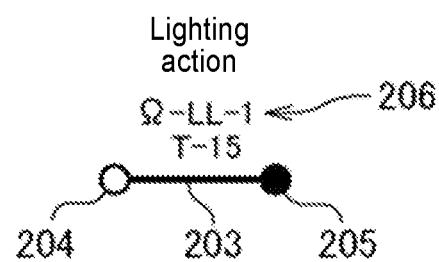

FIG. 8B describes a lighting action to be performed with an illuminator. The lighting action to be performed with the illuminator is also described using the action line 203 having the start point 204 at the left end and the end point 205 at the right end, with the element action 206 (Ω-LL-1 in this example) written above the action line 203 to indicate the lighting action to be performed with the illuminator. The manner of lighting (e.g., whether the illuminator is steadily on or flashing) can be specified using a parameter.

Figure 8C:
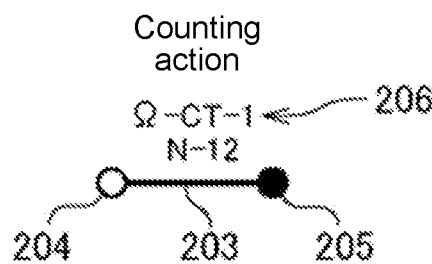
Figure 8D:
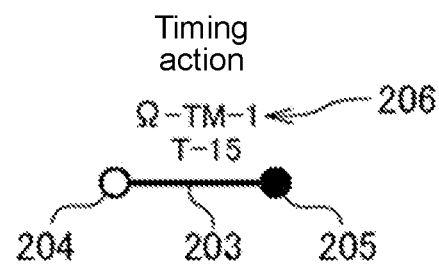
Figure 8E:
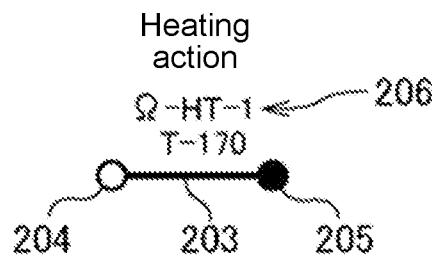

The actions defined to be equivalent to the element actions described on the YOGO chart 200 may also include a counting action for counting the number of times the switch (or button) is pressed until a predetermined count is reached, a timing action for measuring a predetermined time elapsed after the switch (or button) is pressed, and a heating action for heating an object with a heater or for cooking materials. FIG. 8C describes a counting action for counting until a predetermined count is reached using a counter. FIG. 8D describes a timing action for measuring a predetermined elapsed time using a timer. FIG. 8E describes a heating action using a heater.

In the automated manufacturing machine 1, the actions may start in response to the switches being ON or OFF. In some embodiments, the actions may be complete in response to the switches being ON or OFF. The YOGO chart 200 may thus describe the states of the switches as the condition for starting or completing the actions.

Figure 9A:
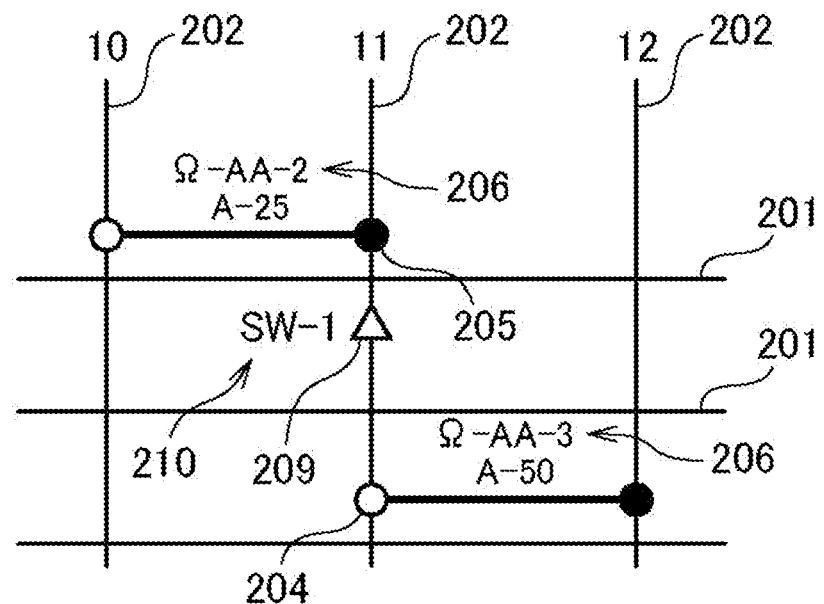
FIGS. 9A and 9B are example YOGO charts each describing the state of a switch used as the condition for starting an action.
Figure 9B:
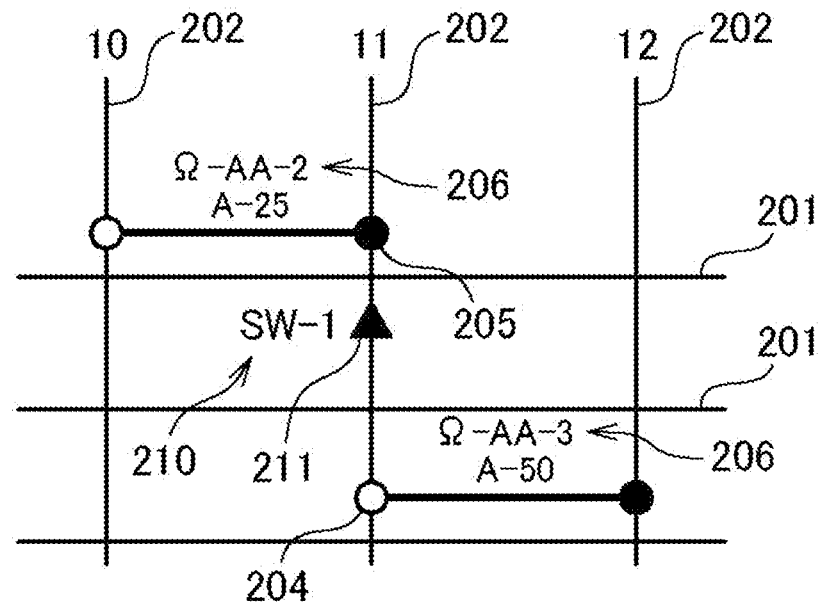

FIGS. 9A and 9B are example YOGO charts 200 each describing the state of a switch used as the condition for starting an action. In the example of FIG. 9A, the number-11 trigger line 202 includes the end point 205, the start point 204, and an outlined triangle. The outlined triangle indicates an action for determining whether the switch is ON (hereafter, an ON determination action 209). The ON determination action 209 is written with switch information 210 adjacent to the ON determination action 209. The switch information 210 identifies the switch to be determined. The ON determination action 209, the start point 204, and the end point 205 are written in different areas defined by the separation lines 201. The description in FIG. 9A indicates that the element action 206 (Ω-AA-3) starts in response to the element action 206 (Ω-AA-2) being complete and the switch SW-1 being turned on (or being ON).

In the example of FIG. 9B, a solid triangle is shown instead of the outlined triangle indicating the ON determination action 209. The solid triangle indicates an action for determining whether the switch is OFF (hereafter, an OFF determination action 211). The OFF determination action 211 is also written with switch information 210 adjacent to the OFF determination action 211. The switch information 210 identifies the switch to be determined. The description in FIG. 9B indicates that the element action 206 (Ω-AA-3) starts in response to the element action 206 (Ω-AA-2) being complete and the switch SW-1 being turned off (or being OFF).

Figure 10A:
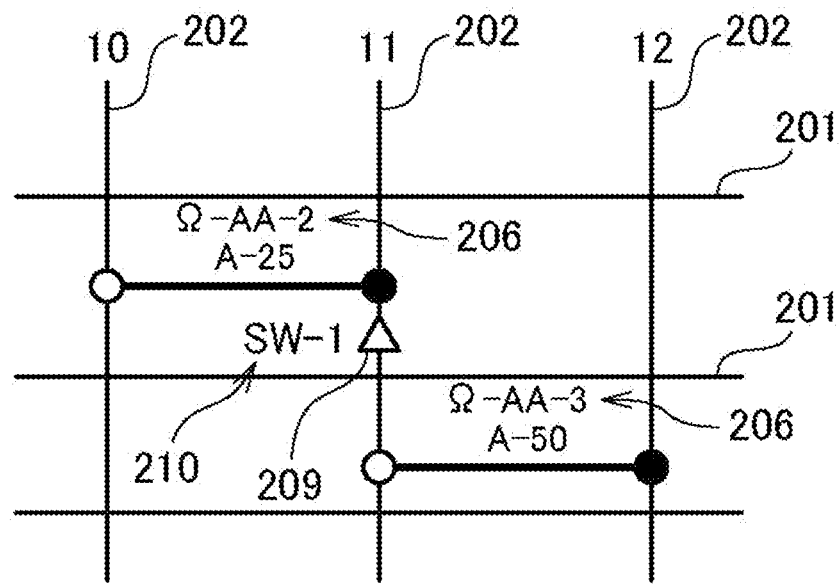
FIGS. 10A and 10B are example YOGO charts each describing the state of the switch used as the condition for completing an action.
Figure 10B:
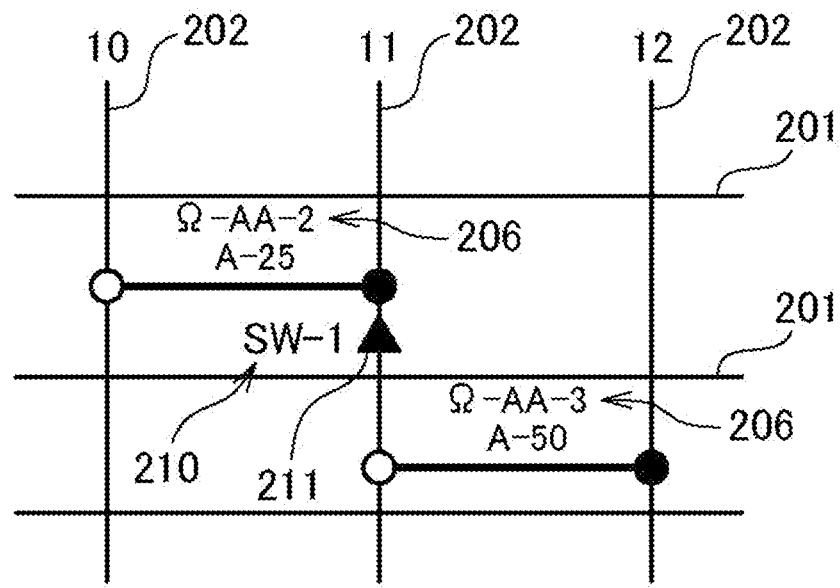

FIGS. 10A and 10B are example YOGO charts 200 each describing the state of the switch used as the condition for completing an action. In FIG. 10A, the ON determination action 209 indicated by an outlined triangle and the end point 205 are written in the same area defined by the separation lines 201, unlike in FIG. 9A referred to above. This indicates that the ON determination action 209 is the condition for completing the action. The description in FIG. 10A indicates that the element action 206 (Ω-AA-2) is complete and the element action 206 (Ω-AA-3) starts in response to the switch SW-1 being turned on.

In the example of FIG. 10B, the OFF determination action 211 is shown instead of the ON determination action 209 in FIG. 10A. The description in FIG. 10B indicates that the element action 206 (Ω-AA-2) is complete and the element action 206 (Ω-AA-3) starts in response to the switch SW-1 being turned off.

B-3. Mechanism of Generating Control Program Written in Machine Language from YOGO Chart As described above with reference to (B) of FIG. 3, the YOGO chart 200 describing the operation of the automated manufacturing machine 1 can be compiled with a dedicated compiler to automatically generate the control program written in a machine language executable by the control computer 50. This is achieved with the mechanism below.

The YOGO chart 200 describes the operation of the automated manufacturing machine 1 by linking the element actions of the actuators incorporated in the automated manufacturing machine 1 or the actions equivalent to the element actions (refer to FIGS. 8A to 10B) to each other using logical operations. The processes for the logical operations can also be used to determine the conditional branching based on the branch conditions and to determine whether to repeat actions based on the repetition conditions. For the element actions or the actions equivalent to the element actions, the program elements to perform such actions can be pre-created. The program elements may be written in a high-level programming language or in a machine language.

To perform the logical operations or determinations based on the conditions for branching or repetition, simple programs are used. Such simple programs can be generated automatically. To convert the YOGO chart 200 into a control program, the YOGO chart 200 is first analyzed to extract the element actions (and the actions equivalent to the element actions) described on the YOGO chart 200 and to extract the logical operations (or the determinations of conditions) linking the actions to each other. The element actions (and the actions equivalent to the element actions) are then replaced with the pre-created program elements. These program elements are then combined together using a program corresponding to the extracted logical operations (or the determinations of conditions). This allows automatic generation of the control program written in a high-level programming language or in a machine language from the YOGO chart 200. In the present embodiment, a control program generation apparatus 100 described below is used to generate the control program.

C. Control Program Generation Apparatus 100 According to Present Embodiment

Figure 11:
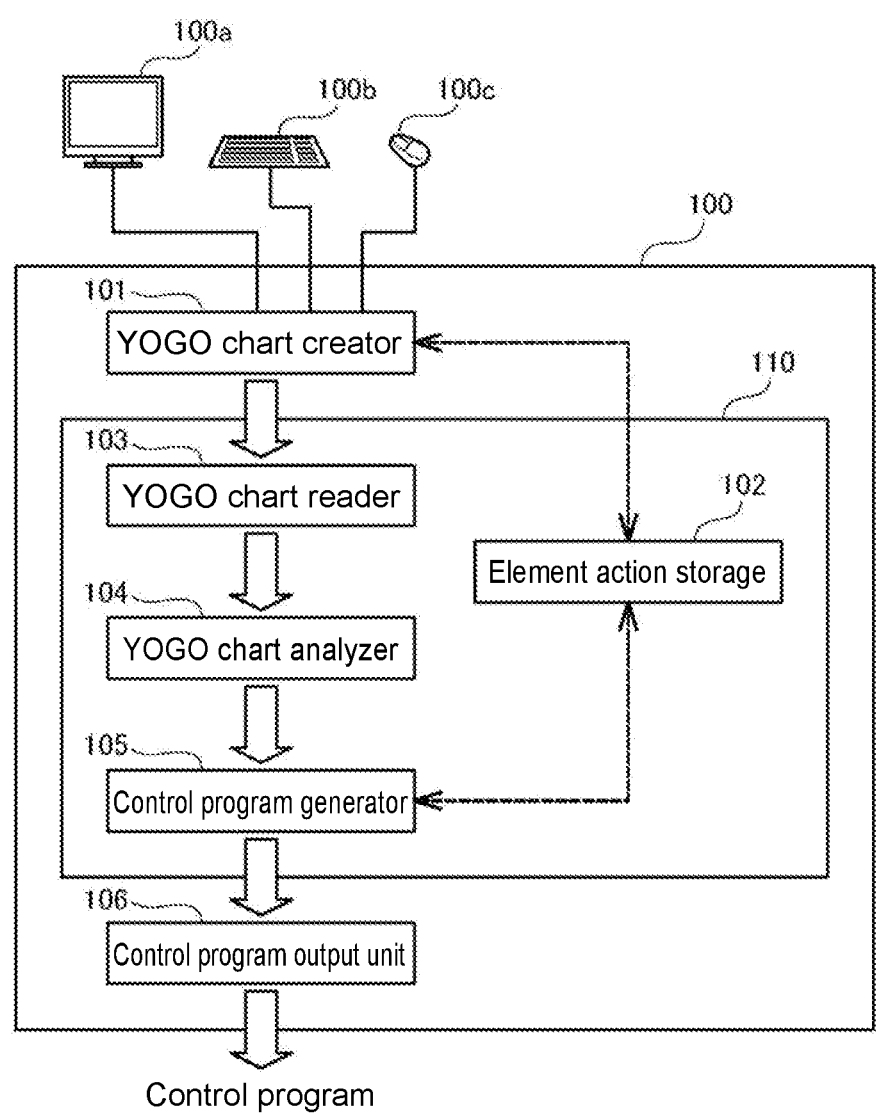
FIG. 11 is a functional block diagram of the control program generation apparatus 100 according to the present embodiment.

FIG. 11 is a functional block diagram of the control program generation apparatus 100 according to the present embodiment. The control program generation apparatus 100 according to the present embodiment can be implemented with a personal computer.

As shown in FIG. 11, the control program generation apparatus 100 according to the present embodiment includes a YOGO chart creator 101, an element action storage 102, a YOGO chart reader 103, a YOGO chart analyzer 104, a control program generator 105, and a control program output unit 106. These units are conceptual representations of multiple functions to be included in the control program generation apparatus 100 classified to create the YOGO chart 200 and to automatically generate the control program from the YOGO chart 200. The control program generation apparatus 100 thus may not be a combination of components corresponding to these units. These units can be implemented in various forms, such as a program executable by the CPU, an electronic circuit combining integrated circuit (IC) chips and large-scale integrated (LSI) circuits, or a combination of these.

The YOGO chart creator 101 is connected to, for example, a monitor screen 100a, a keyboard 100b, and a mouse pointer 100c. A mechanical engineer with sufficient knowledge about the automated manufacturing machine 1 creates the YOGO chart 200 as illustrated in FIG. 4 by operating the keyboard 100b and the mouse pointer 100c while viewing the monitor screen 100a. As described above, the YOGO chart 200 describes the operation of the automated manufacturing machine 1 by combining the actions of the multiple actuators incorporated in the automated manufacturing machine 1. The machine designer sufficiently considers appropriate combinations of the actions of the actuators to achieve the operation of the automated manufacturing machine 1 when designing the machine. The machine designer can thus easily create the YOGO chart 200 describing the operation of the automated manufacturing machine 1. By any mechanical engineer with sufficient knowledge about the structure and operation of the automated manufacturing machine 1, the YOGO chart 200 can also be created easily.

As described above with reference to FIGS. 4 to 8, the element actions 206 (or the actions equivalent to the element actions) are to be written on the YOGO chart 200. The element action storage 102 stores, in a manner associated with each other, the names of the actuators (or the speakers, illuminators, switches, or other devices) and the element actions 206 to be performed by the actuators or other devices.

FIG. 12 is a table including the names of the actuators and other devices associated with the element actions 206. The element action storage 102 stores the correspondences. As shown in the figure, the actuators or other devices are stored in a manner associated with the element actions 206 (including the actions equivalent to the element actions such as a timing action) to be performed by the actuators or other devices. For an actuator or another device having multiple types of element actions or other actions to be performed, the element actions 206 to be performed are stored. For the element action 206 having a parameter to be specified, the parameter to be specified is also stored. For the element action 206 ($\Omega$-AA-1) at the top in FIG. 12, for example, a parameter A to be specified is stored. For the third element action 206 ($\Omega$-AA-3) from the top, two parameters A and B to be specified are stored. For the fourth element action 206 ($\Omega$-AA-4) from the top, no specifiable parameter is stored.

As shown in FIG. 12, the program element names are also stored for the respective element actions 206. The program element names refer to the names of the programs to perform the element actions 206 (or the actions equivalent to the element actions). Being simple, the element actions and the actions equivalent to the element actions can be performed with small programs that can be incorporated as parts of larger programs. The programs to perform such actions are thus herein referred to as the program elements. The program elements may be written in a high-level programming language or in a machine language.

As shown in FIG. 11, the YOGO chart creator 101 is connected to the element action storage 102. The machine designer (or the mechanical engineer) can refer to the data in FIG. 12 stored in the element action storage 102 for creating the YOGO chart 200. Any mechanical engineer with sufficient knowledge about the automated manufacturing machine 1 sufficiently knows the types of actuators and the manner of operating the actuators. The mechanical engineer can thus identify the element actions 206 from the names of the actuators. The parameters can also be easily specified. The YOGO chart 200 can thus be easily created.

The YOGO chart reader 103 reads the YOGO chart 200 created with the YOGO chart creator 101 and outputs the YOGO chart 200 to the YOGO chart analyzer 104. In the present embodiment, the YOGO chart 200 is created with the control program generation apparatus 100. More specifically, the YOGO chart reader 103 reads the YOGO chart 200 from the YOGO chart creator 101. In some embodiments, the YOGO chart reader 103 may read the YOGO chart 200 created with another computer.

The YOGO chart analyzer 104 analyzes the YOGO chart 200 received from the YOGO chart reader 103 to extract the element actions (and the actions equivalent to the element actions) described on the YOGO chart 200 and to extract the logical operations (or the determinations of conditions) linking the actions to each other. The YOGO chart analyzer 104 then outputs the results to the control program generator 105.

The control program generator 105 refers to the correspondences (refer to FIG. 12) between the element actions 206 and the program elements stored in the element action storage 102. The control program generator 105 replaces the element actions (and the actions equivalent to the element actions) described on the YOGO chart 200 with the program elements. The control program generator 105 combines the program elements together based on the logical operations (or the determinations of conditions) extracted from the YOGO chart 200 using a program to perform such logical operations and other processes. The control program generator 105 thus generates the control program from the YOGO chart 200 and outputs the generated control program to the control program output unit 106. A compiler 110 for generating the control program from the YOGO chart 200 is implemented with the element action storage 102, the YOGO chart reader 103, the YOGO chart analyzer 104, and the control program generator 105.

The control program output unit 106 writes the control program received from the control program generator 105 into the storage area in the control computer 50 (refer to FIGS. 1 and 2) in the automated manufacturing machine 1. The control computer 50 uses the control program to control the various actuators incorporated in the automated manufacturing machine 1, thus controlling the operation of the automated manufacturing machine 1.

The YOGO chart reader 103 in the present embodiment corresponds to an action chart reader in one or more aspects of the present invention. The YOGO chart reader 103, the YOGO chart analyzer 104, and the control program generator 105 in the control program generation apparatus 100 according to the present embodiment may also be implemented as a method for generating the control program. The YOGO chart reader 103 in the present embodiment corresponds to a process of reading the action chart in one or more aspects of the present invention implemented as a control program generation method. The YOGO chart analyzer 104 in the present embodiment corresponds to a process of analyzing the action chart in one or more aspects of the present invention. The control program generator 105 in the present embodiment corresponds to a process of generating the control program in one or more aspects of the present invention. The functions performed by the YOGO chart reader 103, the YOGO chart analyzer 104, and the control program generator 105 in the control program generation apparatus 100 according to the present embodiment may also be implemented as the functions of a program executable by a computer to perform a method for generating the control program for the automated manufacturing machine 1. The YOGO chart reader 103 in the present embodiment corresponds to a function of reading the action chart in one or more aspects of the present invention implemented as a program. The YOGO chart analyzer 104 in the present embodiment corresponds to a function of analyzing the action chart in one or more aspects of the present invention. The control program generator 105 in the present embodiment corresponds to a function of generating the control program in one or more aspects of the present invention.

As described in detail above, the YOGO chart 200 describing the operation of the automated manufacturing machine 1 can be processed by the control program generation apparatus 100 to automatically generate the control program for controlling the automated manufacturing machine 1. This eliminates the work of a programmer creating the control program, thus greatly reducing the time taken to develop a new automated manufacturing machine 1 (to half or less). Introducing new automated manufacturing machines to manufacturing sites is thus easier, achieving labor savings in industry.

The control program generation apparatus 100 according to the present embodiment has been described. However, the present invention is not limited to the above embodiment and may be practiced in various manners without departing from the spirit and scope of the invention.

For example, the YOGO chart 200 in the above embodiment is described using the element actions (or the actions equivalent to the element actions). In some embodiments, the components that perform complicated actions with multiple degrees of freedom may be purchased to be used as actuators in the automated manufacturing machine 1. The components may be controlled to perform predetermined actions. In this case, the predetermined actions to be performed by the components may be defined to be equivalent to the element actions and written on the YOGO chart 200 as the element actions 206. In this case as well, the control program generation apparatus 100 can pre-create the program elements corresponding to the element actions 206 and automatically generate the control program using the program elements.

REFERENCE SIGNS LIST 1 automated manufacturing machine
2 rail
3 conveyor unit
3a holder shaft
3b chuck
4 machining unit
10 to 20 actuator
10d to 20d driver circuit
50 control computer
100 control program generation apparatus
101 YOGO chart creator
102 element action storage
103 YOGO chart reader
104 YOGO chart analyzer
105 control program generator
106 control program output unit
110 compiler
200 YOGO chart
201 separation line
202 trigger line
203 action line
204 start point
205 end point
206 element action
209 ON determination action
210 switch information
211 OFF determination action

The invention claimed is:

1. A control program generation apparatus for generating a control program for an automated manufacturing machine including a plurality of actuators, the apparatus comprising:

one or more processors; and
an element action storage storing a plurality of element actions each indicating an action with an inherent degree of freedom of a corresponding actuator of the plurality of actuators and having a parameter to be set, each of the plurality of element actions being associated with a program element to perform the element action, the control program causing a logical operation of the plurality of the element actions,
wherein:
each of the plurality of the actuators moves an actable part of the automated manufacturing machine, the actable part being configured to rotate, move forward, or move backward;
each of the plurality of the element actions comprises a rotation, a forward, or a backward motion;
the one or more processors are configured to read an action chart describing an operation of the automated manufacturing machine, the action chart including the plurality of element actions included in the operation of the automated manufacturing machine; and
the one or more processors are configured to generate the control program to cause the automated manufacturing machine to operate by combining together the plurality of program elements stored in the element action storage in accordance with the action chart;
based on the logical operation by which an end of one element action is linked to a start of another element action of the plurality of element actions, two or more of the plurality of the element actions start simultaneously and end at independent timings from each other; and
none of the plurality of the element actions starts during a period in which any one of the plurality of the element actions are performed.

2. The control program generation apparatus according to claim 1, wherein
the element action storage stores, in addition to the plurality of element actions, at least one of a sound output operation to be performed with a speaker or a lighting operation to be performed with an illuminator in a manner associated with a program element to perform the sound output operation or the lighting operation, and
the one or more processors read the action chart including at least one of the sound output operation or the lighting operation.

3. The control program generation apparatus according to claim 1, wherein
the element action storage stores, in addition to the plurality of element actions, a heating action to be performed with a heater in a manner associated with a program element to perform the heating action, and
the one or more processors read the action chart including the heating action.

4. The control program generation apparatus according to claim 1, wherein
the plurality of actuators include a sequence-controlled actuator controllable under sequence control, and the element action storage stores an element action of the sequence-controlled actuator in a manner associated with a program element to perform the element action of the sequence-controlled actuator under the sequence control, and
the plurality of actuators include a servo-controlled actuator controllable under servo control, and the element action storage stores an element action of the servo-controlled actuator in a manner associated with a program element to perform the element action of the servo-controlled actuator under the servo control.

5. A control program generation method for generating, with a computer, a control program for an automated manufacturing machine including a plurality of actuators, the method comprises:

reading an action chart, the action chart describing an operation of the automated manufacturing machine using a plurality of element actions and a logical operation, each of the plurality of element actions indicating an action with an inherent degree of freedom of a corresponding actuator of the plurality of actuators and having a parameter to be set, the plurality of element actions including one element action having an end linked to a start of another element action of the plurality of element actions using the logical operation;

analyzing the action chart to extract, from the action chart, the plurality of element actions and the logical operation linking the plurality of element actions; and generating the control program to cause the automated manufacturing machine to operate by referring to stored data including the plurality of element actions each associated with a program element to perform the element action, converting the plurality of element actions described on the action chart into the plurality of program elements, and combining the plurality of program elements together in accordance with the action chart, wherein:

each of the plurality of the actuators moves an actable part of the automated manufacturing machine, the actable part being configured to rotate, move forward, or move backward;

each of the plurality of the element actions comprises a rotation, a forward, or a backward motion;

based on the logical operation by which an end of one element action is linked to a start of another element action of the plurality of element actions, two or more of the plurality of the element actions start simultaneously and end at independent timings from each other; and none of the plurality of the element actions starts during a period in which any one of the plurality of the element actions are performed.

6. A non-transitory computer-readable storage medium storing a program for causing a computer to implement a method for generating a control program for an automated manufacturing machine including a plurality of actuators, the program causes the computer to perform operations comprising:

reading an action chart, the action chart describing an operation of the automated manufacturing machine using a plurality of element actions and a logical operation, each of the plurality of element actions indicating an action with an inherent degree of freedom of a corresponding actuator of the plurality of actuators and having a parameter to be set, the plurality of element actions including one element action having an end linked to a start of another element action of the plurality of element actions using the logical operation;

analyzing the action chart to extract, from the action chart, the plurality of element actions and the logical operation linking the plurality of element actions; and generating the control program to cause the automated manufacturing machine to operate by referring to stored data including the plurality of element actions each associated with a program element to perform the element action, converting the plurality of element actions described on the action chart into the plurality of program elements, and combining the plurality of program elements together in accordance with the action chart, wherein:

each of the plurality of the actuators moves an actable part of the automated manufacturing machine, the actable part being configured to rotate, move forward, or move backward;

each of the plurality of the element actions comprises a rotation, a forward, or a backward motion;

based on the logical operation by which an end of one element action is linked to a start of another element action of the plurality of element actions, two or more of the plurality of the element actions start simultaneously and end at independent timings from each other; and none of the plurality of the element actions starts during a period in which any one of the plurality of the element actions are performed.

* * * * *